March 7, 1961
E. P. G. WRIGHT
2,973,900
ACCOUNTING SYSTEMS
Filed Nov. 9, 1956
3 Sheets-Sheet 1
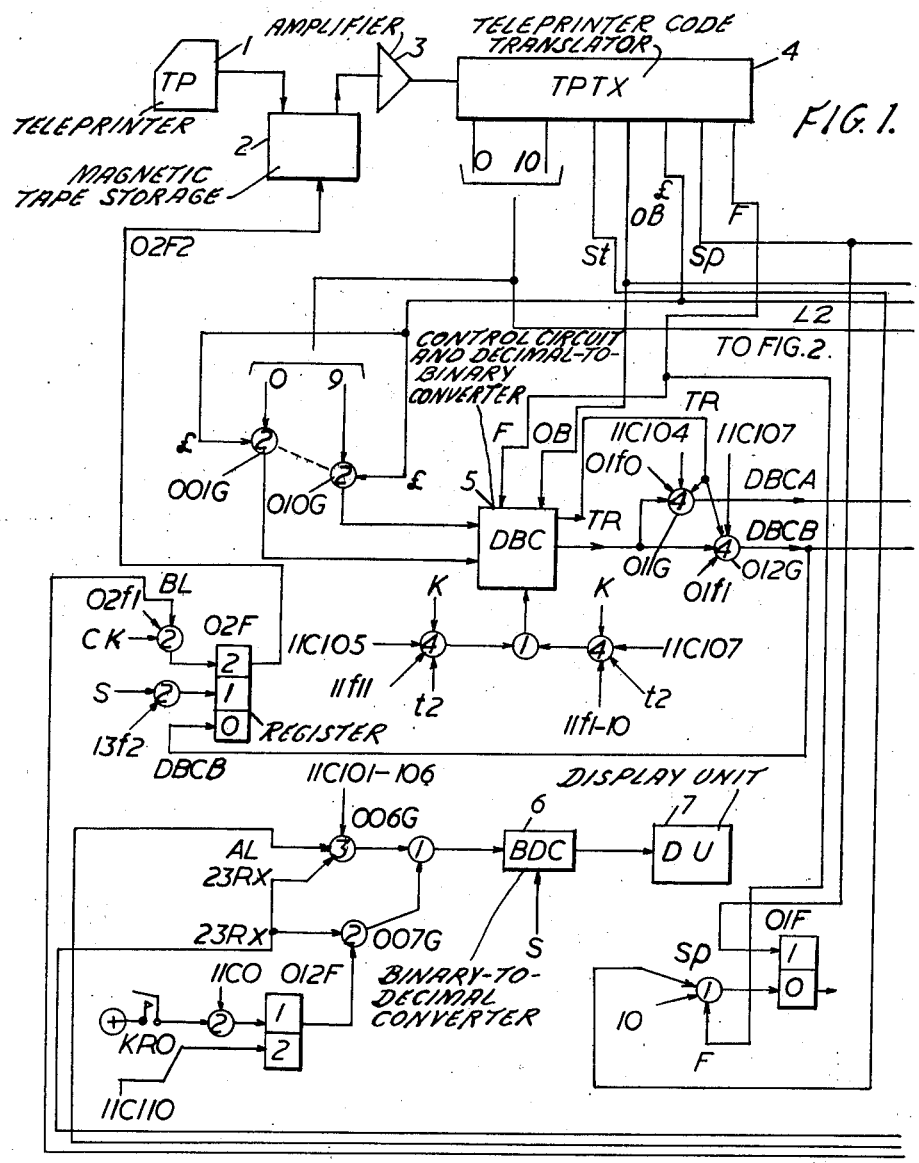
FIG. 1.
Inventor
E.P.G.WRIGHT
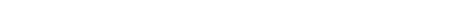
Attorney

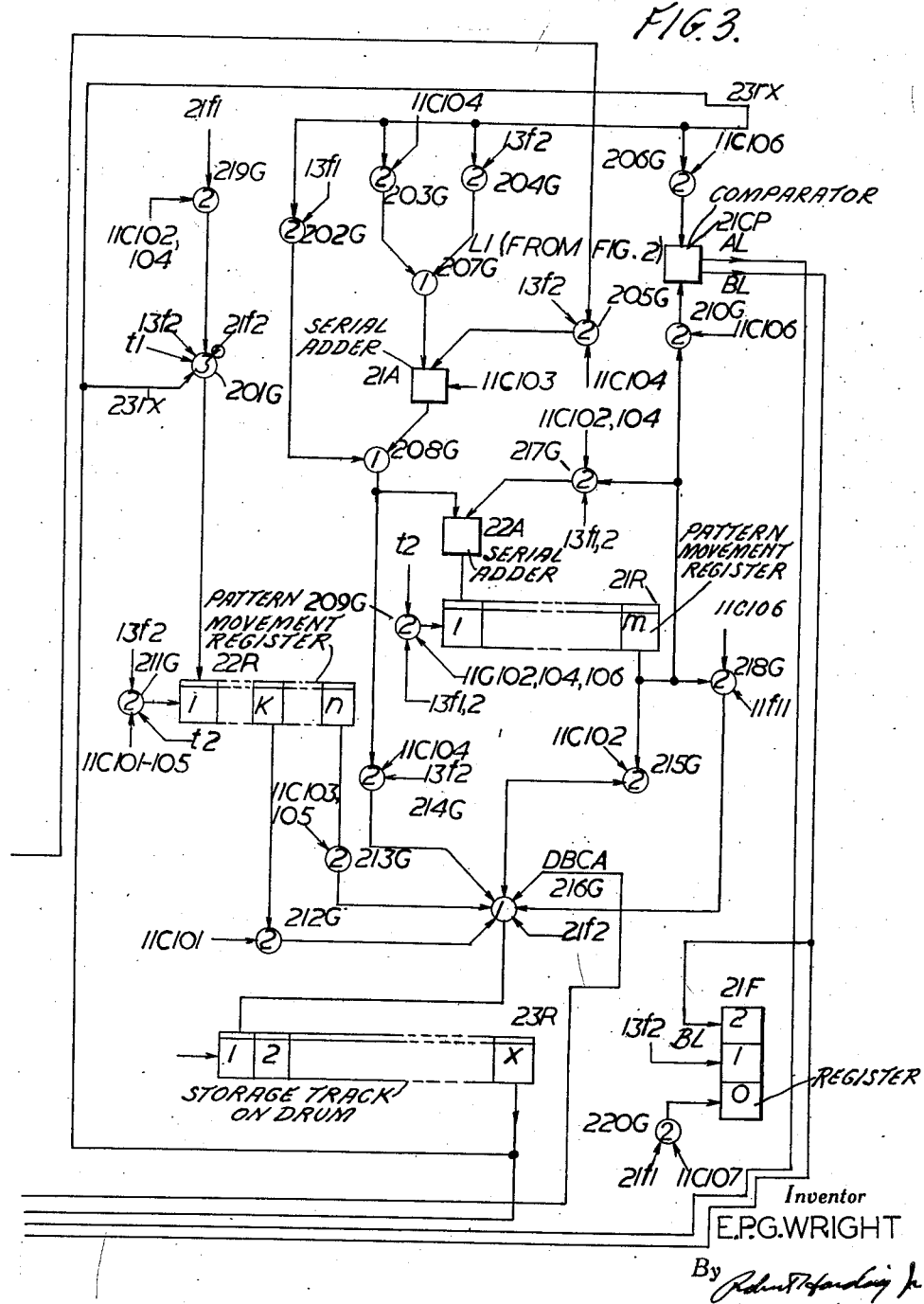

United States Patent Office 2,973,900
Patented Mar. 7, 1961

2,973,900
ACCOUNTING SYSTEMS

Esmond Philip Goodwin Wright, London, England, assignor to International Standard Electric Corporation, New York, N.Y., a corporation of Delaware Filed Nov. 9, 1956, Ser. No. 621,284

Claims priority, application Great Britain Nov. 17, 1955

11 Claims. (Cl. 235—153)

The present invention relates to electrical accounting equipment, and it is an object of the present invention to provide such equipment wherein the accuracy of arithmetic operations performed in respect of stored numbers may be checked from time to time.

It is to be understood that the term number includes a stored representation of a sum of money.

According to the present invention there is provided accounting equipment which comprises a set of storage devices in each of which an arithmetic record may be stored, a transfer register in which may be stored a series of values in sequence to be used to control a modification to the contents of one or several of said set of storage devices, means for making individual modifications to the arithmetic records stored in said storage devices each modification being made under the control of the value stored in said register and means for checking the accuracy of said modification by the comparison of the total of the contents of all said storage devices and the total of the series of modifications both before and after a modification has been effected.

The invention will now be described with reference to the accompanying drawings, in which:

Fig. 1 is a schematic diagram showing equipment used for supplying intelligence to the accounting equipment. The inset to this figure shows certain controlling pulse waveforms which will be referred to hereinafter.

Fig. 3 shows the circuits for performing an arithmetic operation on a selected number and for checking whether or not the operation has been correctly carried out.

GENERAL DESCRIPTION

Figure 2:
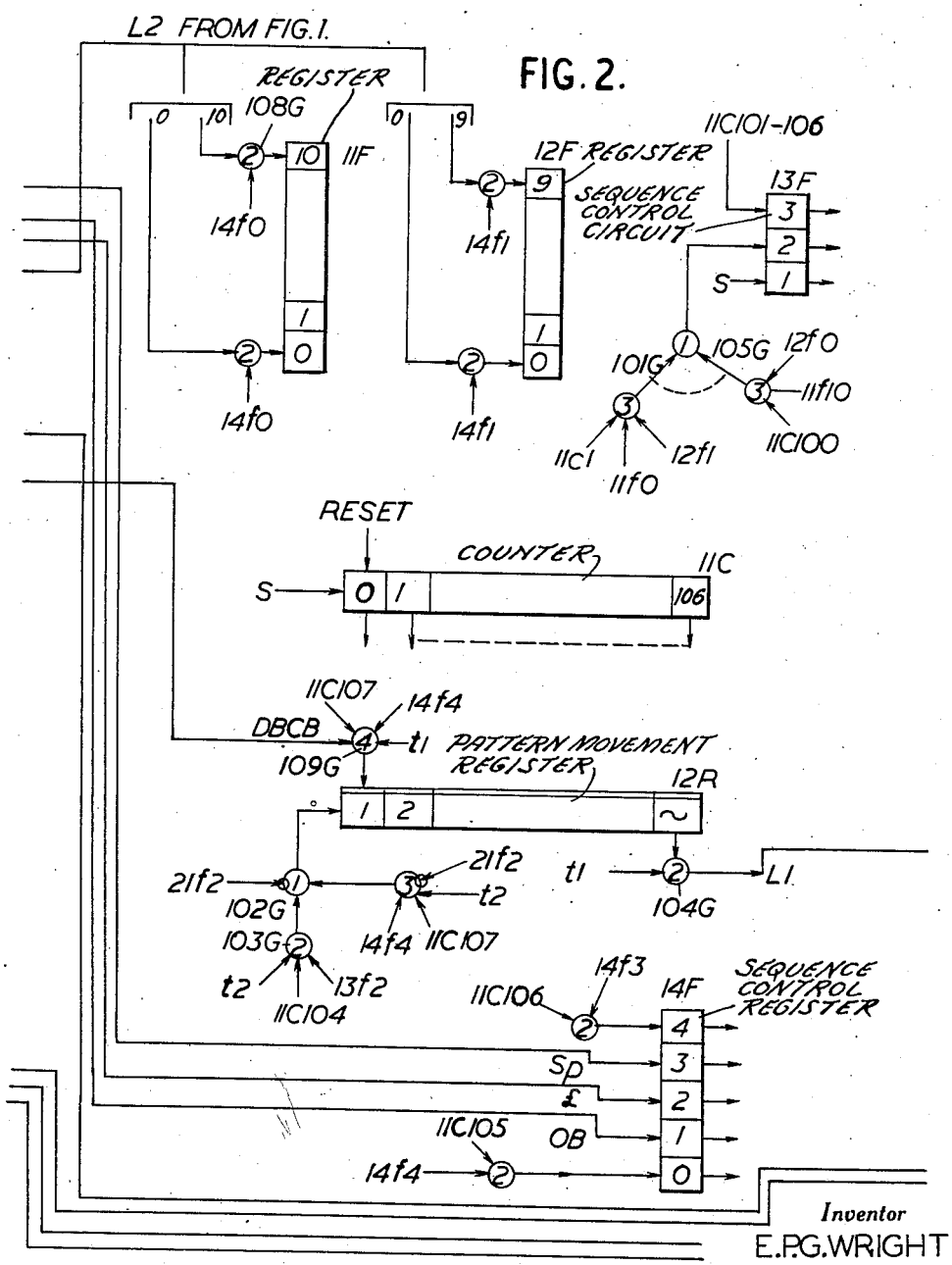
Fig. 2 shows schematically the circuits involved in selecting a number stored in a track on the periphery of a rotatable drum, which number is to be altered by the performance thereon of an arithmetic operation. The figure also includes certain other controlling elements which will be referred to hereinafter.

Before describing the embodiment of the invention shown in the accompanying drawings, it is desirable to describe the mathematical basis of the checking process which are involved.

It is assumed that the storage means in which a number of numbers are stored has a capacity of 100 such numbers. These numbers form separate and independent arithmetic records, and each is stored in a portion of the storage means which is permanently and individually allocated thereto. The arithmetic operations to be performed each consist of adding a further number, called an increment, to a selected one of the stored numbers. Each of these increments, together with characters indicating which number it is to be added to is stored in a further storage means.

The first-named storage means also provides accommodation for six further numbers. Thus it will be convenient to regard this storage means as consisting of 106 separate storage devices. The purposes of these storage devices are as follows:

(a) *Storage devices 1 to 100.*—These, as already mentioned, contain the numbers each of which forms an arithmetic record.

(b) *Storage device 101.*—This is used to record temporarily a number recorded in that one of the storage devices 1 to 100 on which an arithmetic operation has been most recently performed. As will be described later, when an increment is to be added to a number, that number in its condition *before* the addition is inserted into storage device No. 101. Thus a record is retained of this number as it was *before* the arithmetic operation was performed.

(c) *Storage device 102* is used to record the sum of the numbers in storage devices Nos. 1 to 100. Whenever an arithmetic operation is performed on one of these numbers, a new total sum is produced which incorporates the result of that arithmetic operation, and this new total sum is inserted in storage device No. 102.

(d) *Storage device 103* is used to record the sum of the numbers in storage devices 1 to 100 immediately *before* the performance of the most recently completed arithmetic operation. To obtain this sum, the number in storage device No. 102 is transferred to this storage device when an arithmetic operation has been performed.

(e) *Storage device 104* is used to record the sum of a block of increments to be added to respective ones of the stored numbers, but which have not as yet been dealt with. Hence each time an increment is added to a number a new sum of the outstanding increments is produced by subtracting that increment from the old sum.

(f) *Storage device No. 105* records the *previous* value of the sum of the outstanding increments. Each time a new sum is produced for insertion into 104, the number stored therein is inserted into 105.

(g) *Storage device No. 106* is used to record the combined total of the sum of the numbers in storage devices 1 to 100 *and* the sum of the outstanding increments. This total, i.e. the sum of the two sums, should clearly remain unaltered throughout a programme calling for a number of increments to be added to a corresponding number of the stored numbers.

The operation will be explained by considering a numerical example. It is assumed that the next increment to be dealt with is 28, and that it is to be added to the number stored in storage device No. 1. The following table shows the state of the storage devices in this example both before and after the increment has been dealt with. It is to be noted that it is assumed that storage devices 4 to 100 all contain zero.

Table 1

| Storage Devices | Old Contents | New Contents |
| --- | --- | --- |
| 1 | 110 | 138 |
| 2 | 120 | 120 |
| 3 | 130 | 130 |
| * | * | * |
| 101 | X | 110 |
| 102 | 360 | 388 |
| 103 | X | 360 |
| 104 | 195 | 167 |
| 105 | X | 195 |
| 106 | 555 | 555 |

The "old" contents of 101, 103 and 105 are of no interest for the present example and so these portions of the table are omitted.

It will be seen that in both cases the total of the numbers in 102 and 104 equals the number in 106. This, of course, clearly follows from the description which has already been given of the purpose of these storage devices. During each cycle the contents of the storage devices 1 to 106 are examined singly and successively, and the totals are checked in a manner which will be described below. This checking involves the generation of the total of the *new* sum of the numbers in 1 to 100 and of the *new* sum of the outstanding increments. The next step in this checking operation is the comparison of this new total with the former value of this total contained in 106. If these two totals are found to be identical it is assumed that the addition has been correctly performed. If, however, the two totals are found *not* to be identical it is obvious that something has gone wrong. An alarm is therefore given and all operations are stopped. The operator then causes the numbers in 101 to 106 to be read out. Examination of these numbers then occurs to determine what error has occurred.

During the early part of the cycle, in which the contents of all of the storage devices 1 to 106 are examined, the number in the first storage devices whose contents are to have an increment added thereto, in the example under discussion, No. 1, is read out and stored in an external storage device. *At the same time* this number and the increment to be added thereto are supplied to an adder, which adds them together. The result of this addition is the new state of the number in storage device No. 1, and is therefore placed in that storage device from which it was extracted before the addition.

The result of the addition, together with the numbers stored in the other devices 2 to 100 are supplied successively to an accumulator, which produces the new sum of the stored numbers. The reading out which is necessary to permit this summation is effected without destroying the stored record. The summation is effected automatically on each cycle of examination of the contents of 1 to 100, whether or not an increment is dealt with. As already mentioned, during a cycle in which an increment is dealt with, the value of the number to which the increment is added is the value thereof *after* the addition.

When storage device No. 101 is reached during the cycle of examination, the number to which an increment was added is transferred from the above-mentioned external storage device to 101, where it replaces any previous recording therein. Thus a record is made of the number to which the increment was added, but in its *unmodified* state, i.e. *before* the addition of the increment.

When the next storage device, No. 102, is reached, the *old* sum of the numbers in 1 to 100 is extracted therefrom and is passed via a temporary storage device to storage device No. 103. At the same time the *new* sum of the numbers in storage devices Nos. 1 to 100 is transferred from the accumulator to the storage device No. 102.

In a similar manner the new sum of the outstanding increments is transferred to storage device No. 104, and the old sum of outstanding increments is transferred to storage device No. 105. A new total of the sum of the numbers in 1 to 100 and of the sum of the outstanding increments is now produced. This new total is compared with the preceding value thereof recorded in storage device No. 106. If these totals are found to be identical, then it is assumed that the increment has been correctly dealt with.

If the two totals are found to differ, the numbers recorded in storage devices 101 to 106 are read out and studied, and all further computations are stopped. In view of the contents of these stores, the origin of an error can be determined. For example, if the addition has not occurred correctly, the difference between the numbers in 102 and 103 will not be the same as that between the numbers in 105 and 104. The contents of these storage devices are such that most of the possible errors in computation will be indicated, and in any case are such that the "pre-operation" condition can readily be obtained.

CIRCUIT CONVENTIONS

Before proceeding to the detailed description of the circuit diagrams some explanation of the conventions used therein is desirable.

Electronic gates, well-known per se, are shown as circles with incoming controls shown as radial leads marked with arrow-heads touching the circle. Outputs are shown as radial leads with arrow-heads pointing radially outwards. The number inside the circle indicates the total number of incoming controls which must be energised for the gate to deliver an output. A small circle where an incoming control meets the circle indicates that that input is an inhibitory input, i.e. that when it is energised, the gate *cannot* deliver an output no matter how many other controls are energised.

A pattern movement register is represented by a linear array of contiguous rectangles with a double line along their upper long dimension. Each rectangle represents a single stage in the register.

A counter comprising a number of single-component stages each of which is capable of assuming one of two conditions, operated or non-operated, is shown as a linear array of contiguous rectangles. The stages of such a circuit operate singly and successively in a fixed order, and when one stage operates it always renders non-operated the immediately preceding stage.

A multi-stable register comprising a number of single component stages each of which is capable of assuming one of two conditions, operated or non-operated, is shown as a linear array of contiguous rectangles. Unlike a counter, whose long dimension is drawn horizontal, a multi-stable register has its long dimension drawn vertical. The stages of a multi-stable register can operate in any order, and when any stage operates it renders non-operated any previously operated stage.

If all the circuit outputs were connected to the gates which they control there would result a complex network of leads which would be difficult to follow. Therefore in the interests of simplifying the drawings these leads have in certain cases been omitted, and the short control leads to the gates have been given references indicating where they come from.

GENERAL DESCRIPTION OF THE DRAWINGS

At the bottom of Fig. 1 are shown wave forms $t1$ and $t2$, which can be obtained in any well known manner. For each intelligence element position in the storage used for the storage devices 1 to 107 there is one pulse in each of these trains. The S pulses are also obtained in the well known manner and there is one such pulse for each of storage devices 1 to 106. Clearly 1 to 100 will need to have about the same capacity whereas such of 101–106 which record totals will require to be of greater capacity. Hence the S pulses will not necessarily be evenly spaced in time.

In the preferred embodiment of the invention, the storage devices 1 to 106 are all on a track on the periphery of a rotatable drum having a circumferential magnetic skin, and therefore a convenient method of producing these clock pulse trains is to use recordings on a number of auxiliary tracks on the drum. In Fig. 3 the intelligence-storage track on the drum is drawn as if it were a pattern movement register, i.e. 23R represents the drum track. Other forms of serial store, such as sonic delay lines or cathode ray tubes or ferromagnetic storage matrices, could be used, in which case separate sources for the various controlling pulse trains would have to be provided.

Fig. 1 includes the input equipment, consisting of a teleprinter 1, magnetic tape store 2, amplifier 3, teleprinter code translator 4 and a control circuit which includes a decimal to binary converter 5. It also includes the output circuit, which includes a binary-to-decimal converter 6 and a display unit 7.

Fig. 2 includes a counter 11C which has a rest position 11C0 and a position for each storage device on the track. In the case shown it has 107 positions. At the end of each full cycle a reset pulse restores 11C to 11C0 in readiness for the S pulse for storage device number 1. When using a magnetic drum track, this reset pulse can also be obtained from a permanaent recording on the drum.

The identity of the storage device to whose contents an increment is to be added is set on two multistable registers 11F and 12F which have 11 and 10 positions respectively in a manner to be described later. 12R is a pattern movement register in which the next increment to be added is inserted. This increment which, in the present case is in binary notation can be inserted either in the series fashion as shown, or in parallel fashion. 13F forms a sequence control circuit and normally has its element 13F1 operated, being restored to this condition on such S pulse, while 14F is a multi-stable register acting as a sequence control circuit for the supply of intelligence.

The circuits in Fig. 3 include 23R which represents the storage used. As has already been stated, this is a track on a magnetic drum in the embodiment described. However, other forms of storage, such as pattern movement registers, sonic delay lines, such as the mercury delay line and the so-called magneto-strictive delay line, cathode ray tube storage devices, ferro-magnetic storage matrices, and ferro-electric storage matrices may be used.

SUPPLY OF INFORMATION

It is assumed that the system is working in whole numbers of pounds sterling, that the sum of outstanding increments is £195, that £28, is to be added to store No. 1, and that this store contains £110. This information has to be supplied to the system such that the sum of outstanding increments is inserted in storage device No. 104. The information will be supplied by typing from the teleprinter 1 in the following format:

```
10/4    £195    Space
0/1     £28     Space
.
.
.
7/4     £19     Space    Stop
```

The prefix in front of the pounds sign conveys the identity of the storage device to which the sum of money after the pounds sign is to be added. Thus 0/1 represents storage device No. 1 and 7/4 represents No. 74. 10/4 indicates that the number is to be placed in storage device No. 104.

This information is initially typed in to a tape storage unit 2, where it is recorded for use. As will be seen, the unit 2 "issues" the information set out above line by line.

The tape machine, when it has a recording thereon runs until its read head reaches a "start S" signal which is prefixed ahead of all the intelligence to be recorded. This, which reaches the translator 4 via amplifier 3 renders the latter effective. The translator 4 has outputs 0 to 10 which are used to control the two registers 11F and 12F (Fig. 2). Register 11F has 11 positions, numbered from 0 to 10 inclusive, while register 12F has 10 positions numbered 0 to 9 inclusive.

Since the first number is a sum of increments, to be put in storage device No. 104, the first teleprinter character is 10, which, via the block of leads represented by L2 sets the register 11F to 11F10. This occurs via the gate 108G, normally open, since 14F normally has its output 14F0 energized.

The next digit to be translated is the oblique stroke separating the two portions of the "address." This causes the output OB of the translator 4 to be energised, as a result of which 14F is set to 14F1 operated. From a perusal of the gates controlling 11F and 12F it will be seen that the result of this is that leads 1–10 are transferred to register 12F, so that the next digit—the second portion of the address—sets 12F to 12F4.

The next character is the pounds sign £. This energises the translator output appropriate thereto, and this in turn sets the register 14F to 14F2. The result of this is that both 11F and 12F are now isolated from the intelligence supply. The leads 0–9 of the numerical leads are now connected via the gates 001G–010G to the decimal-to-binary converter 5. The digits of the number representing the sum of the increments to be dealt with are now received by the translator and applied singly and successively to corresponding leads 0–9 which deliver them to the converter 5, and a binary number corresponding to 195 is therefore generated and stored therein. This number is 11000011. When the conversion is completed, lead TR from the translator becomes energised.

Consequently, when the counter 11C (Fig. 2) reaches 11C104, gate 011G opens, since the bistable device 01F is at 01F0, and at the same time the converted number is driven out of the converter via gate 011G and over lead DBCA to gate 216G (Fig. 3). The converted number therefore passes via gate 216G into storage device 104 of the magnetic drum track 23R.

The pounds digits are followed by a space character, and this energises the output lead Sp from 4. This steps the register 14F to 14F3. Thereafter when the counter moves to 11C106, 14F moves to 14F4. On the next cycle of the drum, when the counter reaches position 105, the register 14F is set back to 14F0 (11C105–14F4) ready for the next line of data.

Immediately after the above operation has been completed, the next line of data commences to pass to the translator 4, and the address portion thereof, which is 0/1, sets the registers 11F and 12F to 11F0 and 12F1 respectively. The oblique stroke is used to reset the converter 5 ready to deal with the next number. The £ sign operates, as already described and conversion occurs in the manner already mentioned. However the space, which followed the last digit of the sum of the increments set the bistable device 01F to 01F1, so that when the conversion is completed 012G is opened at time position 11C107. Therefore the converted number 28 (binary representation 11100) is driven from the converter via gate 012G and over the lead DBCB. At this time 14F has passed to 14F4, so the increment to be added to storage device number 1 passes in to 12R via 109G (11C107, 14F4 and t1). The stepping pulses are generated at t2 under control of 14F4 and 11C107.

Thus the sum of the outstanding increments is in storage device No. 104 of 23R and the increment to be added to storage device number 1 is in 12R. Therefore the operations involved in dealing with this increment will be described.

However, before the description of the addition of this increment, it is worth making a few comments on how the information in the stores originally got there. The original state of the track is, of course, one in which no numbers are stored. There are two possible methods which will be mentioned. The first method is to deal with the original insertion of data as if it were the addition of a number of increments to a corresponding number of the stores. Although this would require a relatively long period, it is thought that this disadvantage is compensated for by the fact that no special controls are required to deal with initial supply of data.

The second method would be to disable all operations connected with checking and summation, and to supply a series of numbers, each prefixed with the number of the store in which it was to be inserted. For each number then the bistable registers 11F and 12F would be set from the prefix and the number temporarily inserted in 12R. Then when the section whose identity is recorded on 11F and 12F reaches the recording head, the number in 12R passes to the track, and thereafter 11F, 12F and 12R are cleared. The next number could then be dealt with in the same manner. This method would need a small amount of extra equipment as compared with the first method, but would be somewhat quicker in operation.

MODIFICATION OF A STORED NUMBER

It will be assumed, as described above, that storage device No. 1 contains 110, that 28 is to be added to this, and that the total of outstanding increments is 195. In that case the contents of the stores will be as shown in Table 1. There are several increments to be dealt with but only one of these has been placed in 12R (Fig. 2) ready to be dealt with.

It will be remembered that the registers 11F and 12F have been set to indicate the number of the storage device for which the increment stored in 12R is intended. In the present case this results in these registers being set to 11F0 and 12F1 respectively.

The sequence controller 13F which normally has 13F1 operated, this being ensured by the S pulses (section pulse), has a set of 100 gates connected to its second unit 13F2. There is one of these gates for each of storage devices 1 to 100. Each of these gates has three controls, one from each of 11F and 12F to define the identity of the storage device to which that gate applies and one from 11C to define the output therefrom for the same storage device.

Hence when 11C has its unit corresponding to the "wanted" storage device operated, which occurs when that storage device is about to be read, 13F steps to 13F2. Two such gates, 101G for store 1, whose controls are 11f0, 12f1 and 11c1, and 105G for store 100, whose controls are 11f10, 12f0 and 11c100, are shown. In the example being discussed 13F2 operates via 101G. Considering now the circuits of Fig. 3, when 13F steps to 13F2 operated, 204G is opened and so can pass intelligence read from the store, represented as the output 23rx from unit x of 23R. The output from 204G is applied via gate 207G to a serial adder 21A, which can conveniently be of the type described in the copending application of Weir et al., Serial No. 396,564, filed December 7, 1953, now Patent No. 2,926,851. At the same time that 204G is opened by 13F2, 205G is also opened by 13f2, and its other effective control is that marked L1, from 104G, which is the output gate for the increment register 12R. 104G delivers its output under control of t1, the pattern being stepped by 103G via 102G. In this case, the combination of t2 and 13f2 steps the pattern, and the output from 104G becomes effective on the t1 pulses each of which is between two t2 pulses, as is shown at the foot of Fig. 1.

Hence the operation of 13F2 causes the pattern in 12R to be read out via 104G and 205G to the serial adder 21A at the same time as the contents of the storage device to be modified are read out of the storage 23R via 204G and 207G to serial adder 21A. The serial adder therefore adds the two numbers together, and the result appears in serial form as the output from gate 208G. This output passes via 214G, open because 13f2 is energised from 13F2, and 216G to 23R, where it is recorded. Thus the required modification to a stored arithmetic record has been effected, and a new number recorded in the same storage device.

GENERATION OF THE NEW SUM OF THE RECORDS

It will be remembered that during each cycle of examination of the storage, a sum is produced by adding together the numbers in the individual storage devices 1 to 100. For this purpose the modified number appearing at the output of gate 208G is applied to a second serial adder 22A, whose other input is received via 217G from the output 21Rm of the register 21R. Since the number being modified was read out of the first storage device examined in the cycle, there is nothing recorded in 21R. Hence the output of 22A passes directly to 21R1, getting there at t1 (this being the control time for 104G). Each t2 pulse, with 13f2 energised, steps the pattern in 21R, so that the modified number is put into the temporary storage device formed by the pattern movement register 21R as well as into the storage 23R. These two insertions, it will be seen, occur simultaneously.

The next S pulse steps 11C to 11C2, and resets 13F to 13F1. Hence gates 204G and 205G are both closed and the closure of 209G stops the step pulses to 21R. However, in this condition 202G opens, since 13F1 is now operated, and the output from 23rx, which is the contents of store No. 2, it is passed via 202G and 203G to the serial adder 22A. This at the same time receives the output from 21Rm, via 217G, the register stepping occurring via 209G at t2 (13f1 energised). 22A adds the contents of store No. 2 and the modified number from 21Rm and the output therefrom is inserted in the accumulator 21R1 at the same time as the previous number is being read out therefrom. Since 13F2 is no longer operated, 214G cannot open, and so no change is made to the arithmetic record for storage device No. 2.

It should be noted that the storage used is of the type in which a recording is maintained unaltered until a modification is necessitated. Further any number of readings can be effected without destroying the recording. If the storage used is one of the type in which re-recording must be effected on each cycle, e.g. sonic delay lines and certain varieties of cathode ray tube stores, gate 214G would be allowed to open during this operation.

The contents of the next 98 storage devices are dealt with in the same manner, the values being read in turn and accumulated by the serial adder 22a and register 21R.

This same summation operation occurs during operational cycles wherein the recorded intelligence is not changed, although means could be provided to prevent this if desired.

CONTROL RECORDINGS

At this point it is necessary to return to the reading of the contents of store No. 1 from 23rx. 13F was then at 13f2, as already described, so at t1 of each element 201G opens. Hence the number in storage device No. 1, i.e. that which had to be modified, is applied to 22R1 via 201G as well as to the adder 21A. 22R is a pattern movement register forming a temporary storage device for the number to be modified, and it receives the input via 201G, stepping pulses being applied at t2 via 211G. The number stored in 22R occupies the first K positions thereof, i.e. positions 22R1 to 22RK.

Thus when storage devices 1 to 100 have been read, the situation is that a modification has been effected to the contents of storage device No. 1, the sum of the numbers in all of these storage devices including the result of the modification to the number in storage device No. 1 is stored in 21R, the number from storage device No. 1 in its unmodified form is in storage device 22R (positions 1 to K), and the increment which was added is retained in 12R since the reading out therefrom did not destroy the record. This is because 12R is a closed ring register.

When the counter 11C reaches position No. 101, 13F3 operates and renders 13F1 non-operated. At the same time 211G opens because of its 11C101 control to admit stepping pulses at t2 to 22R, and 212G opens to pass the output from 22RK to 216G. From 216G this output, the original (before modification) contents of storage device No. 1 enters 23R1. Hence it is inserted in storage device No. 101.

The next S pulse restores 13F to 13F1 and steps 11C to 11C102, which again sets 13F to 13F3. Gate 219G now opens since 21*f*1 is energised, and this opens 201G at *t*1 to pass the contents of storage device No. 102 (from 23*rx*) to 22R. That is, the previous sum of the stored numbers now passes into 22R. 211G supplies step pulses at 11C102 and *t*2. This, with the previous read-out via 212G, now closed, ensures that the former contents of 22R is replaced by the former sum of the numbers in storage devices 1 to 100 read out of storage device No. 102. At the same time as this is in progress, 209G opens (11C102 and *t*2) to apply stepping pulses to 21R, and 215G opens. Therefore the new sum of the numbers in storage devices 1 to 100 (388—see Table 1— in binary form 110000100) is sent via 215G and 216G to 23R1. Therefore it is recorded in storage device No. 102. Once again 21R is a closed ring register, so read-out does not eliminate the contents thereof.

The next S pulse restores 13F to 13F1, and steps 11C to 11C103, which again operates 13F to 13F3. Gate 211G again applies step pulses to 22R, and 213G opens, so that the contents of 22R is stepped out from 22R*n* via 213G and 216G to 23R. Hence the old sum is transferred from storage device 102 via a temporary storage device formed by 22R to storage device 103. At this point it is worth emphasising that the number read out of 22R*n* at 11C103 is a total, and hence is normally a relatively long number, while that read out of 22RK at 11C102 is an *individual number*, and would normally be a shorter number.

The next S pulse restores 13F to 13F1 and steps 11C to 11C104, which in turn re-operates 13F3. Gate 203G opens at 11C104 to pass the number read from storage device No. 104, this being the sum of the increments which were outstanding at the beginning of the cycle, to the adder 21A via gate 207G. At the same time step pulses are applied via 103G (*t*2 and 11C104) and 102G to 12R, so that the single increment which has been dealt with is read from 104G via L1 and 205G to 21A. This number has previously been read out of 12R, but this read-out is effected without losing the contents. For this, 12R is a pattern movement register connected as a closed chain so that a number *n* of step pulses drives it through a complete cycle as a result of which its condition is the same as before those pulses occurred. Obviously the contents of 12R are available via 104G at the same time. The connection via which the circulation path of 12R is completed from 12R*n* to 12R1 is disabled, of course, when a new increment is inserted in 12R. This increment from 12R has to be subtracted from what is read from 23R, so at 11C103, 21A received an input pulse over the connection indicated which converted it into a subtractor for long enough to do a subtraction during 11C104. How this is effected is well known, one example being described in the copending application Serial No. 396,564, now Patent No. 2,926,851, referred to above. The result of the subtraction passes via 208G and 214G (11C104 being energised) to 216G, and therefrom to 23R. Hence the number in storage device No. 104 is replaced by the new sum of outstanding increments. This result of subtraction is also passed to the serial adder 22A.

It will be remembered that the modified sum of the numbers is still in 21R: at 11C104, 209G supplies step pulses (11C104 and *t*2) and 217G opens, so that the modified sum and the new sum of outstanding increments are simultaneously applied to 22A, which adds them together and stores a new overall total in 21R. Further while 11C is at 11C104, the output from 23R*x* (the old sum of outstanding increments) is fed through 201G (*t*1 and 11C104, 219G open) to 22R1, and inserted therein.

On the next S pulse, 11C steps to 11C105 and 13F goes to 13F1 and back to 13F3. The contents of 22R is then read out of 22R via 213G and 216G to 23R, so that the old sum of outstanding increments is inserted in storage device No. 105.

At 11C106, the output from 23R*x* is passed via gate 206G to a comparator 21CP and the output from 21R*m* is fed via 210G to 21CP and simultaneously via 218G and 216G back again to 23R1. This comparator checks to see that these two values are identical, and gives an alarm over the output lead AL shown if a discrepancy is detected. If there is no discrepancy after a check it energises BL. If there is no error the equipment is ready to deal with the next increment. The control to allow this is exercised by a register 02F. This is normally at 02F0, and the combination of 13F2, and S, which comes after an increment has been added sets it to 02F1. Then a correct check, BL energised, sets it to 02F2. This applies a signal to the tape machine 2 so that the next increment is dealt with. If BL is not energised, 2 receives no signal.

OPERATION IF AN ERROR INDICATION OCCURS

The example which will be discussed is that in which the increment has been added incorrectly. Hence the new sum in store 102 (see Table 1, right hand column for the correct figures) is wrong. The result of the alarm signal is to prevent modification during the next cycle and to read out the contents of storage devices 101 to 106. An output from 21CP over lead AL to the control position in Fig. 1 prevents any further modification, and 006G opens from 21CP (control AL) at each of 11C101, 102, 103, 104, 105, 106. Gate 006G therefore passes these contents of the storage devices 101 to 106 to a binary-to-decimal (or to sterling if the system is used in a banking system wherein British currency is used) converter BDC. This is reset on each S pulse so that the number in those storage devices are independently dealth with. The output from BDC, which consists of the results of these conversions, is passed to a unit DU which causes display in any desired manner, e.g. by teleprinter after suitable speed changing. A suitable binary-to-decimal converter is described in the application filed by Wright and Rice on September 16, 1954, Serial No. 456,509.

The units BDC and DU are also used when the stored data is read out in toto: when this is required, gate 007G is opened from the 1 output of bistable device 012F to pass all intelligence from 23R*x* to BDC. This bistable device can only operate to its 1 state as the storage device No. 1 commences to be read, and restores to its non-operated state after one cycle of the examination. Its control is derived from a normally open "read-out" key KRO which is connected to a gate 015G, whose other control is 11C0 (Fig. 2). The output from 015G is only present when "read-out" is required and the first storage device is the next to be read. It operates 012F to its 1 state, which opens the gate 007G. At the end of the cycle, 11C110 resets 012F to its 0 state to close 007G, and stop the read out.

Returning to the operation in response to an error detection, the contents of the check storage device have now been displayed by DU. It has been assumed that the addition has not occurred correctly, so that although the contents of 103 plus those of 105 equal that of 106, the contents of 102 plus those of 104 do *not* equal this amount. The last increment which was dealt with is known to be 28, and if the number in 102 is *not* 28 in excess of that in 103, the modification has been made incorrectly. Then it is necessary to see whether 28 has been correctly added to the number in storage device No. 1, and this can be done since the former number from storage device No. 1 is now in No. 101. After the error has been traced and corrected, energisation of CK operates 02F2 to restrict operations. The final stop signal energises lead F from the translator 4 to terminate all operations.

GENERAL

The value inserted in storage device No. 104 before any operations have occurred is a preliminary operation, the means for doing it not being shown in detail. This is, in fact, effected via gate 216G, which, opens to insert a sum of outstanding increments received from gate 011G over DBCA (from the decimal-binary converter in the control position), into 23R1. This is done during a preliminary operation where required, as already indicated. At the same time the contents of 21R are transferred to storage device 106, this being effected by initially setting 11F to its eleventh position 11F10. This means that at 11C106, 218G opens and the contents of 21R enter 23R, passing into store 106.

Some or any of the stores 101 to 106 could be on a different drum track from 23R. Where there are several groups of storage devices, for instance several drum tracks, or several sonic delay lines, or several cathode-ray tubes, the totals in these groups can be amalgamated, or treated separately within each group. In such a case the check operation for a number of stores can be effected "transversely" i.e. by checking for a number of storage devices one from each group, with auxiliary storage devices for recording the previous number in the storage device whose contents are modified, and for recording the previous value of the total. Such a cross-check is achieved by a parallel recording of the contents of the storage device examined simultaneously, or by examining the storage device on a diagonal basis, that is No. 1 on No. 1 track, No. 2 on No. 2 track, No. 3 on No. 3 track and so on, permitting a serial mode of operation.

The foregoing operational description has assumed that a series of increments are to be dealt with automatically in a number of successive operations, one per cycle at the end of each of which a check sequence occurs. To achieve economy of working, the check sequence can, if desired, be arranged to occur after any desired number of cycles where the operation occurs under the control of an operator. The arrangements whereby this may be achieved are relatively simple and so are not shown.

While the principles of the invention have been described above in connection with specific embodiments, and particular modifications thereof, it is to be clearly understood that this description is made only by way of example and not as a limitation on the scope of the invention.

What I claim is:

1. Accounting equipment which comprises a set of storage devices in each of which electrical signals representing an arithmetic record may be stored, a transfer register in which may be stored a series of signals in sequence to be used to control a modification of the contents of one or several of said sets of storage devices, means for making individual modifications of the signals representing arithmetic records stored in said storage devices each modification being made under the control of the control signals stored in said register, means for obtaining signals representing totals of the contents of all said devices, both before and after a modification is made, means for obtaining signals representing totals of the series of modifications both before and after a modification is made, and comparing means for checking the accuracy of said modifications by the comparison of the contents of both said signals obtaining means both before and after a modification has been effected.

2. Accounting equipment, as claimed in claim 1, further comprising a second set of storage devices for the signals representing all totals and for signals forming one of said records before a modification has been made.

3. Accounting equipment, as claimed in claim 2, in which the modification-making means comprises means for adding signals representing a value stored in said transfer register to the signals representing the arithmetic record stored in a selected one of the storage devices of said first-named set of storage devices, further comprising means for storing signals representing the sum of the values of the signals in said transfer register which have not been dealt with, which sum is obtained by the means for obtaining signals representing totals of modifications in one of said second set of storage devices, and in which the means for obtaining signals representing the total of the series of modifications after a modification is made comprises means for altering said adding means for subtracting signals representing the value of the modification from signals representing the sum of the values in said one storage device and storing signals representing the new sum of outstanding values thus obtained in another one of said further set of storage devices.

4. Accounting equipment, as claimed in claim 3, further comprising means for storing signals representing the totals of all of the arithmetic records stored in said first set of storage devices in a further one of said second set of storage devices, and in which said checking means comprises a second adder and means for applying signals representing the stored numbers to said adder for summation when a modification has been made, whereby a new sum of said records is produced, and means for recording signals representing said new sum of said records in a further one of said second set of storage devices.

5. Accounting equipment, as claimed in claim 4, further comprising means for storing signals representing the total of the sums of outstanding values and the sum of the records in one of said second set of stores, and in which said checking means further comprises means for producing a new total of the signals representing said two sums after a modification has been made of one of said records, and said comparing means comprising a comparator for comparing the total of said two sums before a modification has been made with the total of said two sums after a modification has been made, and means under control of said comparator for giving an alarm if said two totals differ, indicating that an error has occurred.

6. Accounting equipment, as claimed in claim 5, further comprising means responsive of signals representing the making of a modification of signals representing one of said records for storing of signals representing the number forming that record in its unmodified state in one of said second set of stores, and means for reading out signals representing the numbers for examination when an error indication has occurred to trace the source of the error.

7. Accounting equipment, as claimed in claim 1 in which said storage device comprise a serial memory, said equipment further comprising recording and reading means, the contents of said storage devices being in operative relation with said recording and reading means singly and successively.

8. Accounting equipment, as claimed in claim 7, further comprising control means for causing all operations associated with a modification to one of said records to occur during a single cycle in which each said storage device is in operative relation with said recording and reading means once.

9. Accounting equipment, as claimed in claim 8, and in which said serial memory is formed by a peripheral magnetic track on a rotatable drum.

10. Accounting equipment, as claimed in claim 9, in which each signal representing a value in the transfer register is accompanied by a signal recording which identifies the number of the storage device whose contents it is to modify, said equipment further comprising means to register said identifying signal recording, a counting device having an output for each storage device of said first-named set, a coincidence gate for each storage device which is controlled by said counting device and by said identifying-recording-registering means, so as to give an output when that storage device is the next to come into operative relation with said recording and reading means, and control means responsive to an output from any one of said gates to cause the signal record in the next storage device to come into operative relation with said recording and reading means to be modified.

11. Accounting equipment, which comprises a first set of storage devices in each of which signals representing a number forming an arithmetic record may be stored, a transfer register in each of which signals representing a series of values may be stored each of which is to be added to one of said numbers, each said value signals being accompanied by signals identifying the storage device to the contents of which it is to be added, a second set of storage devices, means for storing in said second set of storage devices signals representing the sum of all numbers whose representative signals are in said first set of storage devices before a signal representing a number has another signal representing a value added to it, signals representing the sum of all values in the transfer register which have not been dealt with, and signals representing the total of said two sums, means under control of the signals accompanying signals representing a value for selecting the storage device containing the signals representing the number to which those signals are to be added, means under control of said selecting means for extracting signals representing that number from its storage device, means under control of said selecting means and of said extracting means for storing the extracted signals representing the number in its unaltered form in a storage device of said second set, an adder, means for applying said extracted signals representing the number and the signals representing value to be added thereto to said adder, means for causing the sum of said signals representing said number and said value produced by the addition thereof by said adder to be stored in the storage device of said first set from which said number was extracted, means for subtracting the value signals which have been dealt with from the sum of said value signals, means for causing a new sum of value signals which have not been dealt with as produced by said subtracting means to be stored in a storage device of said second set, means for summating the signals representing numbers in said first set of storage devices after a value signal has been dealt with, means for causing said new sum of signals representing said numbers to be stored in a storage device of said second set, means for adding signals representing said two new sums to produce a new total thereof, a comparator, means for applying said total and the former total of said two sums stored in a storage device of said second set to said comparator, and means under control of said comparator for giving an alarm if said two totals differ, indicating that an error has been detected, the location of said error being determined by an examination of the contents of the storage devices of said second set.

References Cited in the file of this patent

UNITED STATES PATENTS

| | | |
|---|---|---|
| 2,005,807 | Smith | June 25, 1935 |
| 2,700,755 | Burkhart | Jan. 25, 1955 |
| 2,701,095 | Stibitz | Feb. 1, 1955 |
| 2,702,380 | Brustman | Feb. 15, 1955 |
| 2,755,996 | Williams | July 24, 1956 |
| 2,769,592 | Burkhart | Nov. 6, 1956 |
| 2,787,416 | Hansen | Apr. 2, 1957 |
| 2,789,759 | Tootill | Apr. 23, 1957 |
| 2,855,584 | McCarroll et al. | Oct. 7, 1958 |